United States Patent [19]
Yoshimura

[11] Patent Number: 4,750,009
[45] Date of Patent: Jun. 7, 1988

[54] COLOR INK JET SYSTEM PRINTER CAPABLE OF HIGH DEFINITION PRINTING

[75] Inventor: Hisashi Yoshimura, Nara, Japan

[73] Assignee: Sharp Kabushiki Kaisha, Osaka, Japan

[21] Appl. No.: 860,868

[22] Filed: May 8, 1986

[30] Foreign Application Priority Data

May 9, 1985 [JP] Japan ................................ 60-99199

[51] Int. Cl.$^4$ ............................................ G01D 15/18
[52] U.S. Cl. ................................. 346/140 R; 400/126
[58] Field of Search ......................... 346/140; 400/126

[56] References Cited

U.S. PATENT DOCUMENTS 4,511,907 4/1985 Fukuchi ............................ 346/140
4,516,139 5/1985 Takiguchi .......................... 346/140
4,554,556 11/1985 Hirata ............................ 346/140 X
4,571,599 2/1986 Rezanka ............................ 346/140

FOREIGN PATENT DOCUMENTS 3304769 8/1983 Fed. Rep. of Germany .

*Primary Examiner*—Joseph W. Hartary
*Attorney, Agent, or Firm*—Birch, Stewart, Kolasch, & Birch

[57] ABSTRACT

An ink jet system printer has a printer head on which a plurality of orifice groups are provided in the main scanning direction of the printer head to correspond to various color inks, the orifices in each group being spaced by a specified distance away from one another in the sub-scanning direction. One of the plurality of the orifice groups consists of a larger number of orifices than the rest and all the orifices in the larger group are vertically aligned with the specified space therebetween. For character printing, the larger orifice groups is selected so that characters of higher definition are printed out at a higher speed. Thus, the ink jet system printer can be used for multiple purposes such as color figure printing and character printing.

2 Claims, 3 Drawing Sheets

COLOR INK JET SYSTEM PRINTER CAPABLE OF HIGH DEFINITION PRINTING

BACKGROUND OF THE INVENTION

1. Field of the Invention

The present invention relates to a color printer which sprays ink of various colors such as yellow, magenta, cyan and black onto the recording medium in order to make color print-outs.

2. Description of the Prior Art

For printing out figures and characters in multiple colors, an on-demand ink jet printer is conventionally used which prints out figures and characters in color by a mixture of cyan, magenta, yellow and/or black inks loaded on the printer.

FIG. 1 shows the construction of such conventional on-demand ink jet printer. As shown, the printer has slide shafts 2 and 3 mounted parallel to each other in front of a platen 1. A carriage 4 is supported by the slide shafts 2 and 3 so as to be horizontally movable along the platen 1.

The carriage 4 is driven by a pulse motor (not shown) which is connected with the carriage 4 through wire. The carriage 4 contains an ink tank 5 and moves rightward for printing operation.

The ink tank 5 is provided with a printer head 6 on the side facing the platen 1. Four ink cartridges 7, 8, 9 and 10 of different color inks are inserted in the ink tank The cartridges 7, 8 and 9 are for the three primary color inks; yellow, magenta and cyan, and the cartridge 10 is for black ink. The three primary color inks are mixed as necessary on the recording medium in printing out picture elements of multiple colors.

FIG. 2 is a front view of the printer head 6.

Four orifice groups 6Y, 6M, 6C and 6B are horizontally arranged on the printer head 6 and each group consists of four vertically aligned orifices 11, 12, 13 and 14. From right to left in the printing direction, the orifice groups 6Y, 6M, 6C and 6B are for yellow, magenta, cyan and black inks, respectively. The orifices 11, 12, 13 and 14 in each group correspond to four vertical recording dots for a picture element. The four orifice groups are horizontally spaced from one another by eight-dot equivalent distance. Each of the four orifices 11, 12, 13 and 14 in each group is aligned on the same line with the corresponding orifices in the other groups.

Although the above conventional color printer is generally used for colored figure printing, it is also demanded as an ordinary printer which prints out characters in black.

That is, the demand for multi-purpose printers which can print out not only color figures but also characters of high definition is growing in recent years.

The printer head of the above conventional color printer is, however, designed for color figure printing with the space of 1/120 inches between the vertical recording dots. Therefore, high speed character printing is not possible with this printer head.

In other words, the conventional color printer is very slow in character printing operation. Besides, the characters printed out are of poor definition. In short, the conventional printer functions poorly as a character printer.

OBJECTS AND SUMMARY OF THE INVENTION

1. Objects of the Invention

Accordingly, the object of the present invention is to provide a multi-purpose ink jet system printer which can print out not only color figures but also characters of high definition at a high speed.

Other objects and further scope of applicability of the present invention will become apparent from the detailed description given hereinafter. It should be understood, however, that the detailed description and specific examples, while indicating preferred embodiments of the invention, are given by way of illustration only; various changes and modifications within the spirit and scope of the invention will become apparent to those skilled in the art from this detailed description.

2. Summary of the Invention

According to an embodiment of the present invention, a plurality of orifice groups are arranged in the mainscanning direction on a printer head, each group corresponding to different color ink. The orifices in each group are aligned at a specified interval in the sub-scanning direction of the printer head. One of the plurality of the orifice groups contains a larger number of orifices than the rest, and the orifices in the large group are all aligned at the same specified interval in the sub-scanning direction. The large orifice group is selected for character printing operation so that characters of high definition can be printed out at a high speed. Thus, the present invention can achieve a multi-purpose ink jet system printer which is suitable for character printing as well as for color figure printing.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 3:
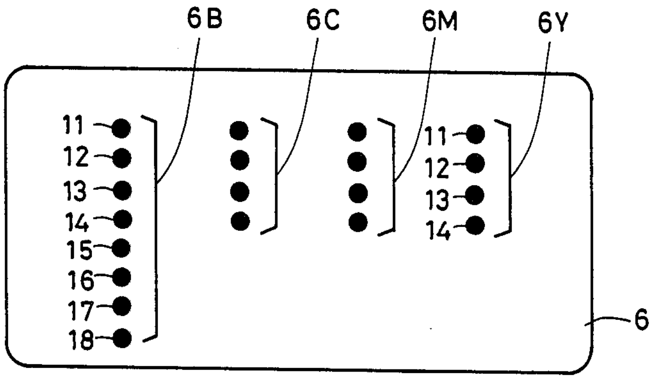
FIG. 3 is a front view of an embodiment of a printer head of the present invention included in the color ink jet system printer of FIG. 1.

FIG. 3 is a front view of an embodiment of a printer head 6 of the present invention. Orifice groups 6Y, 6M, 6C and 6B for yellow, magenta, cyan and black inks, respectively, are arranged in this order from the right to left (in the main-scanning direction of the printer head 6). Orifices 11, 12, 13 and 14 are vertically aligned in the sub-scanning direction in each group, and correspond to four vertical recording dots for a picture element. Each of the orifices 11, 12, 13 and 14 of each group is horizontally aligned on the same line with the corresponding orifices of the other groups.

The orifice group 6B for black ink consists of the above four orifices 11, 12, 13 and 14 and additional four orifices 15, 16, 17 and 18 which are aligned with the first four orifices 11, 12, 13 and 14. These eight orifices 11 through 18 are all uniformly spaced.

Using the orifice group 6B of eight orifices 11 through 18 for character printing, the printer of the present invention can print out characters twice as fast as the conventional printer.

Figure 1:
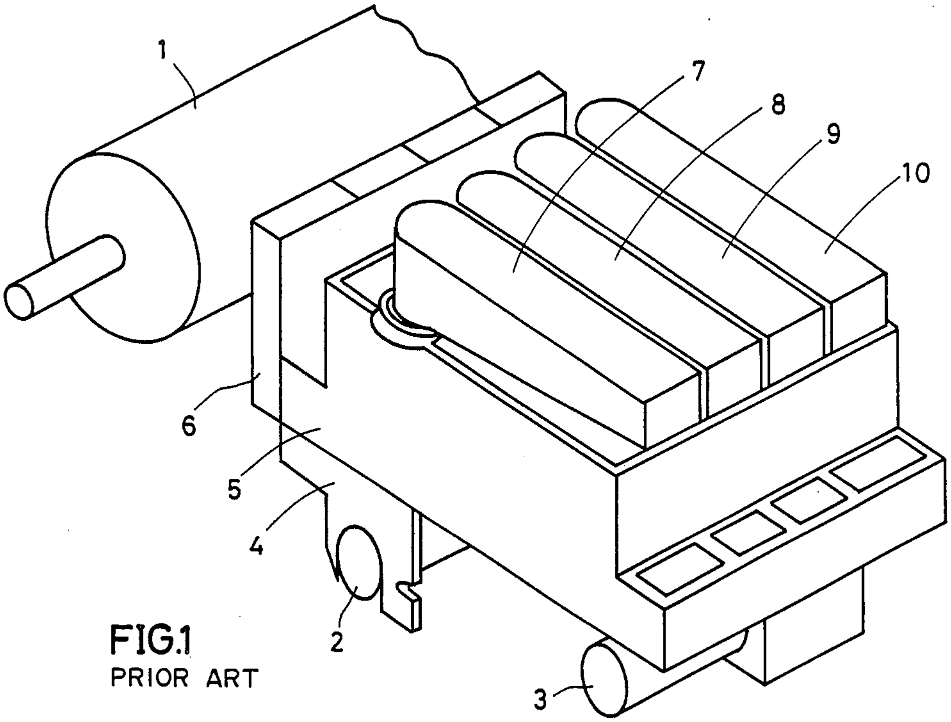
FIG.1 PRIOR ART
FIG. 1 is a perspective view of an ink-on-demand type color ink jet system printer.
Figure 2:
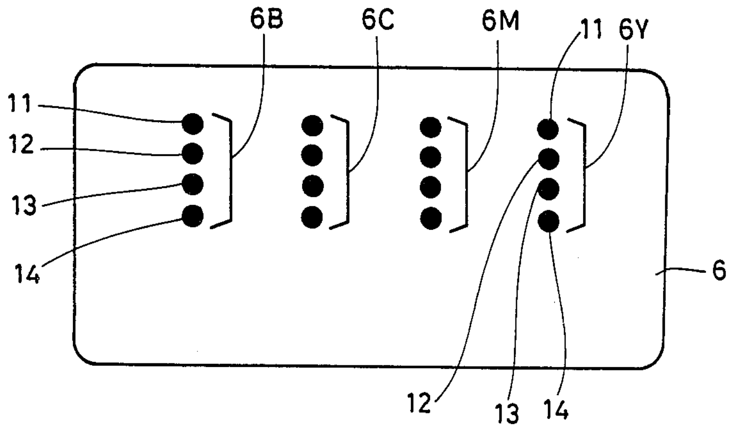
FIG.2 PRIOR ART
FIG. 2 is a front view of a conventional printer head included in color ink jet system printer of FIG. 1.

Specific description of the ink tank, ink cartridges and other constructions of the present invention is omitted here because they are the same as shown in FIG. 1.

Figure 4A:
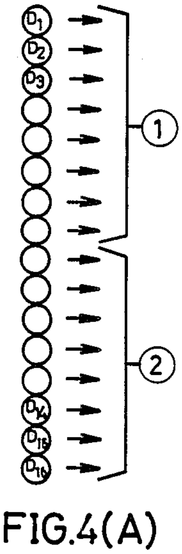
FIGS. 4(A) and 4(B) are schematic charts for explaining character printing modes performed by the printer head of FIG. 3.
Figure 4B:
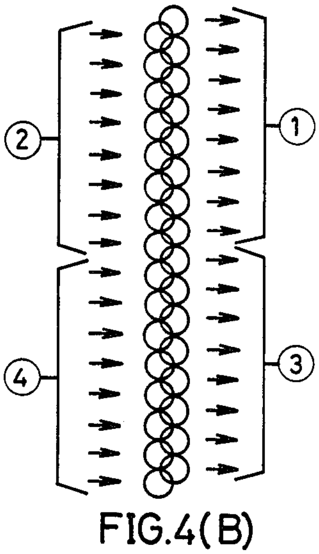

FIGS. 4(A) and 4(B) indicate the character printing modes performed with the orifices 11 through 18. In this example, the matrix for characters consists of 16×10 dots. FIG. 4(A) shows the normal character printing mode in which the printer head 6 reciprocates two times for scanning in the order of ① and ② to print dots $D_1$ through $D_{16}$. FIG. 4(B) shows the character printing mode for higher definition, in which the printer head 6 reciprocates four times for scanning in the order of ①, ②, ③ and ④. After scanning of ① and ③, the recording paper is fed by a half pitch of a dot while the printing timing is also staggered by a half pitch with respect to the main-scanning direction. As a result, dots are printed between dots by the scanning steps of ② and ④.

Figure 5A:
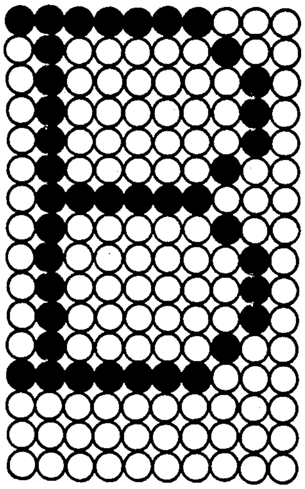
FIGS. 5(A) and 5(B) are schematic charts for explaining actual print-outs conducted by the character printing modes of FIGS. 4(A) and 4(B), respectively.
Figure 5B:
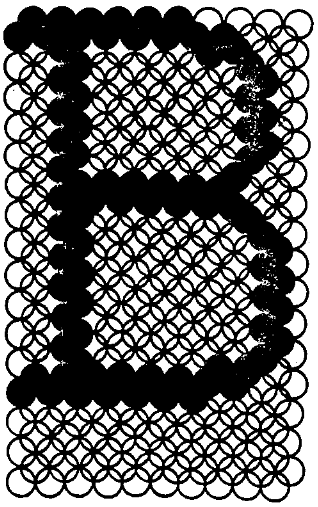

FIG. 5(A) is an actual print-out of a character "B" by the printing mode of FIG. 4(A), and FIG. 5(B) is another actual print-out of "B" by the printing mode of FIG. 4(B).

As obvious from the above, characters of high definition can be printed out at a high speed by the printer of the present invention. When the printer of the present invention is to be used for ordinary color figure printing, the orifices 11 through 14 of the orifice groups 6Y, 6M, 6C and 6B are used.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer which conducts printing operations through the relative movement of a color ink-jetting printer head and a recording medium, wherein a plurality of orifice groups are provided in the main-scanning direction on the printer head, corresponding to various color ink cartridges loaded in the printer, the orifices in each of said orifice groups being vertically aligned with a specified space therebetween, one of said plurality of orifice groups consisting of a larger number of orifices than the rest, said one of said plurality of orifice groups having each orifice therein linearly aligned such that ink jetted therefrom will produce a longitudinally aligned printed pattern, said one of said plurality of orifice groups being used for charcter printing while the other of said plurality of orifice groups are used for graphic printing, said ink jet system being operable in one of two modes, one mode being an ordinary printing mode and the other mode being a high definition mode, said printing operation during said high definition mode further including means for scanning the printer head four times in order to print said aligned pattern, said means for scanning operating in a scanning direction and means for adjusting the positioning of the medium upon which the pattern is printed after two of said scan times by a half a pitch of one of said printed patterns in a direction generally perpendicular to said scanning direction and means for staggering printing time of said printer head by half a pitch of one of said printed patterns in a direction generally parallel to said scanning direction such that a high definition printed character is obtained.

2. The ink jet system printer as claimed in claim 1, wherein said larger orifice group is used for black ink jetting.

* * * * *